Patented Dec. 22, 1931

1,837,331

UNITED STATES PATENT OFFICE

BEVERLY OBER AND EDWARD H. WIGHT, OF BALTIMORE, MARYLAND, ASSIGNORS, BY MESNE ASSIGNMENTS, TO THE OBERPHOS COMPANY, OF BALTIMORE, MARYLAND, A CORPORATION OF MARYLAND

METHOD FOR PREPARING PHOSPHATIC FERTILIZER

No Drawing.   Application filed March 30, 1927. Serial No. 179,706.

This invention relates to the preparation of fertilizer materials, and more particularly is directed to a process for producing phosphatic fertilizer.

In the usual method of producing acid phosphate and double superphosphates, phosphatic material and acid are mixed in an open pan and the resulting mass is run by gravity into a concrete den or chamber. A charge of from one to two tons is mixed in the mixing machine and these are dumped one on another in the den.

In the prior processes the acid and rock are mixed for only a very short period, varying from three to eight minutes. If kept in the mixer for a longer time further mixing is rendered impossible by reason of the "set up" or solidification of the mass, and the discharging of the mixing apparatus is rendered almost impracticable after the set up.

This relatively short mixing period presented many disadvantages. It precluded a thorough incorporation of the phosphatic material and acid and hence did not provide the maximum contact surface and consequent effective utilization of acid.

It is an object of our invention to devise a novel method of, and apparatus for mixing a potentially reactive mass of phosphatic raw material and a reagent.

Another object is to control the physical and chemical conditions during the mixing of phosphatic material and acid to retain the mass in a mixable condition for a longer period of time than could be done heretofore.

A further object is to provide a method of manufacturing phosphatic fertilizer by which phosphatic material and an acid may be retained in a mixable condition for a determinable period of time.

Yet another object is to devise an apparatus through which an effective control of the conditions of mixing may be exercised to prolong the mixing period and maintain a mixable condition of the mass for a pre-determined time.

With these and other objects in view, our invention comprises mixing phosphatic raw material and an acid and exercising such control of the conditions of the mass as to retain it in a mixable state for a prolonged period.

In the prior methods, as has been indicated, the agitation or mixing period is terminated by reason of the reactivity of the mass itself and not at the volition of the operator. This stiffening or "set up" as it is termed, is due chiefly to three causes. The first is the loss of water from the mass with the consequent lowering of its fluidity. When the acid, ground phosphate rock and impurities are brought in contact certain reactions ensue which are exothermic and generate considerable heat. Certain of these reactions eventuate in gaseous products. When the mixing is conducted in open pans, as is the general practice, the heat of reaction causes evaporation of the water which is then driven off from the mass. In addition to this, the evolved gases entrain and remove not an inconsiderable quantity of the water. The mix tends to progressively solidify and the initial slurry or mixable condition is lost.

A second factor contributing to the termination of the mixable condition of the reactive mass is the formation of solid end products, which is hastened by the catalytic action of the exothermic heat from the heats of reaction.

Thirdly, the acid which is about forty-five percent or more of the original mix is fluid at the beginning but is largely changed over, after reactions proceed, into the solid state. These solid end products, such as mono-calcium phosphate, di-calcium phosphate and calcium sulphate take up large amounts of water, as water of crystallization, if the chemical reactions are allowed to run to completion. This water of crystallization is, in effect, virtually converted within the mass from a fluid to a solid water of crystallization and hence tends to break down the initial slurry or mixable state.

Each of the separate factors discussed depend primarily upon the reactivity of the mass. We have found that we can control this and, as a result, are able to maintain the mixable condition and by suitable agitation intimately disperse the solid rock through the liquid acidifying medium. To accomplish this we regulate the conditions of the mass in such a manner as to retard its reactivity.

Our process may be carried out in a mixing pan of the usual type with slight modifications in structure. As is known, a typical mixing machine comprises a rotatable pan mounted on a ball bearing raceway. The pan has secured to its rim a geared ring or annulus which meshes with driving gears suitably connected, through a motion transmission mechanism, to a source of power. The pan is provided with a non-rotatable cover, usually in one piece, supported from A frames adjacent the machine. The cover is apertured to receive two or more elongated bearings which journal the shafts of the agitating apparatus, which is usually of the rotary plow type. The cover is also apertured to provide acid and dust inlets and a gas vent. Mounted on the cover by a suitable bracket is a hand lever, which is pivoted at one end to the rod of the outlet plug. As is known, the plug lever is raised and lowered to regulate the flow of the sludge.

To carry out our improved process, means are provided within the pan to subject the sludge to the action of a cooling medium. This heat abstracting means may consist of a series of coils appropriately positioned within the pan. If desired a separate coil, having a plurality of convolutions may be positioned adjacent the inner cylindrical surface of the pan. This coil may be supported from the non-rotatable cover by suitable depending brackets. A second coil may be mounted centrally of the pan, suspended from the cover by any conventional type of support.

The ends of the coils protrude through the cover and may be connected to the inlet and outlet of a tank containing a suitable cooling medium. As an example the coils may be connected to a brine tank. In the inlet line a pump may be interposed to force a brine through the coils at any desired velocity.

In operation phosphate dust, from a dust weighing hopper, passes through a chute and a hole in the cover to the mixing pan. A strong acid, such as sulphuric acid or phosphoric acid, is then admitted and allowed to flow by gravity through the acid pipe in the usual manner. The motor is started and the plow and base pan are simultaneously rotated.

As has been indicated when the acid and rock are brought into contact certain reactions between the phosphatic materials and the impurities in this occur with the acid. If these reactions are allowed to run a considerable amount of heat is generated. This heat of reaction in addition to accelerating further reaction vaporizes much of the water and tends to eliminate the sludge in the manner described. In our process as the acid and rock are mixed, a cooling medium is coursed through the liquid mass and abstracts heat therefrom. By cooling the mix in this manner at the incipient reactive stage, an effective retardation of the initial and final reactions is attained. A certain degree of reactivity may obtain; however, the generated heat of such reactions is quickly removed from the mass and vaporization of the water is retarded. By reason of the fact that we are enabled to retard vaporization and heat catalysis and thus retain substantially the initial quantity of materials, a mixable condition may be maintained for a longer period. It is also to be noted that in carrying out our process there is less danger of loss of water due to entrainment by escaping gases. By cooling the mix the tendency towards vaporization of liquids is greatly minimized, and hence the total quantity of generated vaporous products is lowered. An additional advantage of this mode of treatment resides in the fact that substantially the initial concentration of the elements of the mass is maintained.

It will be appreciated that the fundamental conception of the invention is the maintenance of a mixable condition of the reactive mass for such a period of time as will insure an intimate mixture of the ingredients. An effective mode of accomplishing this is to restrain or retard the reactivity of the mixture of phosphatic material and an acid. In the process hereinbefore described this restraint or retarding of the reactivity has been accomplished by a regulation of temperature and more specifically by the withdrawal or dissipation of heat from the reactive mass. Hence the apparatus which was described is to be taken as indicating only one of the many ways that the desired control may be effected. Thus in lieu of inserting coils within the pan we may dispose them about the inside, or, if desired, place the pan itself in a cooling bath.

While the particular apparatus described is well adapted to effectuate the principles of our invention, we prefer to utilize another type. In the device about to be described, use is made of the fact that effective control of the reactivity of the mass to be treated may be secured by regulating the pressures and temperature. To carry out the process we provide a horizontal rotary autoclave as our mixing element. This autoclave is provided with a hollow shaft or trunnion at each end adapted to support the container for rotatable movement. The body of the autoclave is preferably fitted with a relief valve, a thermometer and a pressure gauge. The body of the container is also provided with a detachable cover. One of the hollow shafts is adapted to nest a valved acid line opening into the autoclave at one end and connected at its other to an acid tank. The other hollow shaft may be connected to a vacuum pump or any other suitable means which will induce a partial vacuum, or reverse pressure, within the autoclave. We prefer to provide the autoclave with an exterior shell, which in conjunction with the interior shell, serves to form a jacket into which may be admitted heating and cooling media.

In carrying out the mixing, phosphate rock dust and acid, or the components of an acid, may be admitted separately or simultaneously to the autoclave. We prefer to first run in the dust and to set up a suction in the vapor line by operating the vacuum pump and thus draw in and distribute the acid. In actual practice the dust is first admitted to a weighing hopper and then run by gravity through a chute and the open manhole into the autoclave. The cover is then bolted in place and a reduced pressure is induced therein by operation of the vacuum pump. During the time that the reduced pressure is being created the autoclave is continuously rotated.

After the desired reduced pressure has been obtained, the valve in the vacuum line is closed. The valve in the acid line is then opened and acid admitted. It is to be understood that the acid pipe extends practically the full length of the autoclave and is perforated, so that even distribution of the acid over the phosphatic mass is obtained. After all the acid has been admitted the valves in the acid and vapor lines are closed. It is to be understood that both the rock dust and acid may be injected under pressure.

As has been explained hereinbefore, when the phosphatic raw material and acid are brought into contact, certain reactions occur which generate considerable heat and gaseous products. In the old processes this heat of reaction vaporized a considerable quantity of water. As the gaseous products of reaction percolated upwardly through the mass some liquid was entrained. Since the materials were mixed in open containers, the vaporized and entrained water was carried off through the vent pipes, thereby removing it from the mass and tending to eliminate the mixable condition or slurry, in the manner described. In the present method, since a sealed container is used, escape of water due to either of these factors is positively prevented. The retention of substantially the initial water content is a most important factor in maintaining the mixable condition.

Our process is peculiarly well adapted to control the second factor which directly effects the maintenance of the mixable condition. Since the evolved gases of reaction are not permitted to escape, an autogenous pressure is built up within the autoclave. This pressure serves to retard chemical reactivity of the mass. This retardation of the reactivity, as has been pointed out, prevents the formation of solid end products and the conversion of fluid water into solid water or water of crystallization.

It will be observed that by retaining the water content of the original mass as fluid water and controlling the pressure and temperature conditions within the autoclave and then by the chemical reactivity, we exercise control, over all of the factors which tend to eliminate the mixable condition.

In some instances, when the insoluble phosphate is of a high carbonate content, the pressure generated by the initial reaction may become so excessive as to retard reactivity beyond the desired extent. We secure against this contingency by providing the autoclave with a relief valve so that pressure may be released when desired. We have found that it is advisable to first allow a development of pressure up to twenty pounds. When this point is reached the relief valve is opened and the pressures in the autoclave diminished after which the valve is again closed and the pressure allowed to again build up.

We may also utilize the autoclave for the same purpose as the open mixing pan previously described. To do this, the relief valve on the container may be opened to its fullest extent. When the phosphatic material and acid has been admitted, the autoclave may be rotated and a cooling fluid, such as a brine, circulated through the thermal jacket. The circulating cooling medium abstracts heat from the mix and tends to maintain the mixable condition by restraining volatilization of the liquid and by retarding the reactivity of the mass.

In carrying out the process the autoclave is rotated for approximately a half hour, during which time the autoclave is sealed and the mass subjected to the autogenous pressure. It is to be appreciated that during this period the temperature of the mass has considerably increased due to the exothermic state of reaction. This generated heat has a tendency to accelerate the reactions and would under normal conditions accelerate the formation of the solid end products. However, by imposing pressures on the mass reactivity is retarded and the secondary reactions which eventuate solid end products are restrained.

During the mixing period the mass of raw material and acid is maintained in a slurry or mixable condition. This desirable physical condition of the mix enables us to obtain an intimate mixture of the rock and acid and to obtain the maximum contact surface and effective acidulation, and hence accelerate subsequent reactions when the mixing period is terminated.

We have found that in controlling the conditions as described for approximately thirty minutes, we can maintain the mass in a fluid state and secure the desirable intimacy of mix. This period, however, may be lengthened or shortened as desired within operative limits and as required by such varying governing factors as degree of subdivision of rock, acid strength, or the like.

After the raw material and acid have been mixed for a predetermined time, the conditions may be adjusted to allow the reactions to take place to form the desired end products. This may be done by reducing the pressure or by the application of external heat to permit reactivity of the mass, or by both. A preferred mode of accomplishing this is to admit a heating medium such as steam, to the thermal jacket. The addition of heat overcomes the retarding effect of the imposed pressures and permits chemical interaction resulting in the desired end products.

When the mass has been maintained under the described conditions for a period of time which is sufficient to convert the insoluble into the available phosphate, the autoclave may be opened and pressures diminished. The quick drop in temperature occasioned by the release in pressure facilitates crystallization and drying of the mass. If desired, the drying may be quickly and effectively done by operating the vacuum pump and subjecting the mass to a reverse pressure, as more fully explained in our application Serial No. 197,761, filed June 9, 1927. The product is removed from the autoclave and ground in a mill. It is then bagged for shipment.

It will be perceived that we have devised a method of mixing phosphatic material and an acid by which a more intimate contact can be obtained than could be done heretofore. By our process the reactive mass may be kept in a mixable condition at the volition of the operator, whereas in prior methods a thorough mix could not be obtained by reason of the rapid stiffening or setting up of the mass. While we have described certain apparatus and processes by which the invention may be carried out, these are given merely as examples, hence we do not intend that the description shall be restrictive. We consider our invention as residing broadly in the concept of controlling the conditions of a reactive mix of phosphatic material and an acid so that a mixable condition is maintained for a prolonged period to obtain the desired results set forth.

We claim:

1. A process for producing phosphate comprising admitting phosphate rock and an acid to a container, agitating the mix while subjecting it to the action of a heat abstracting medium for a predetermined time only.

2. A process for producing phosphate fertilizer comprising admitting ground phosphatic material and an acid to a container, agitating the mix while subjecting it to the action of an extraneous heat absorbing medium for a predetermined time only.

3. A process for producing phosphate fertilizer comprising admitting ground phosphate rock and sulphuric acid to a container, agitating the mass while subjecting the mass to a cooling action to prevent vaporization and loss of the liquid constituents for a predetermined time only.

4. A process of manufacturing acid phosphate from ground phosphatic material and an acid, comprising mixing the phosphatic material and acid in a container, cooling the mix to check volatilization and retard formation of solid reaction products for a predetermined time during which the material is continually mixed, and subsequently applying heat to accelerate the formation of the solid reaction products.

5. A process of manufacturing phosphate fertilizer by the action of an acid on phosphatic material comprising mixing the rock and acid in a container, imposing pressure on the mixture sufficient to maintain it in substantially liquid phase and retarding the formation of solid reaction products, and subsequently releasing the pressure to accelerate the formation of the solid reaction products.

6. A process of manufacturing phosphate fertilizer by the action of an acid on phosphatic material comprising mixing rock and acid in a container, building up the pressure in said container and maintaining the temperature of the mixture of acid and phosphatic material low enough so as to maintain in it substantially liquid phase and retard the formation of solid reaction products and subsequently lowering the pressure and increasing the temperature to accelerate the formation of solid reaction products.

7. A process of manufacturing phosphate fertilizer by the action of an acid on phosphatic material comprising mixing the rock and acid in a container, maintaining the pressure in the container high and temperature of the mixture low enough so as to maintain it in substantially liquid phase and retard the formation of solid reaction products and subsequently increasing the temperature to accelerate the formation of the solid reaction products.

8. A process of preparing phosphatic fertilizer comprising mixing in a confined space, a definite quantity of unavailable phosphatic material with a quantity of strong mineral acid sufficient to produce a mixture that would set under atmospheric conditions, digesting the mixture in said space, maintaining the mixture in an unset or miscible condition in said space while digesting by allowing the pressure in said confined space to build up and by adjusting the temperature of the mass so that the mass is maintained in a miscible condition, and mechanically agitating the mixture.

9. A process of preparing phosphatic fertilizer comprising mixing in a confined space, a definite quantity of unavailable phosphatic material with a quantity of strong mineral acid sufficient to produce a mixture that would set under atmospheric conditions, digesting the mixture in said space, maintaining the mixture in an unset or miscible condition in said space while digesting by allowing the pressure in said confined space to build up, and by adjusting the temperature of the mass so that the mass is maintained in a miscible condition, and mechanically agitating the mixture, and after mixing for a predetermined period while in a miscible condition, raising the temperature of the mass and reducing the pressure in the confined space to increase the reactivity of the mixture and to complete the reaction.

10. A process of preparing phosphatic fertilizer comprising mixing in a confined space, a definite quantity of unavailable phosphatic material with a quantity of strong mineral acid sufficient to produce a mixture that would set under atmospheric conditions, digesting the mixture in said space, maintaining the mixture in an unset or miscible condition in said space while digestng by allowing the pressure in said confined space to build up, and by adjusting the temperature of the mass so that the mass is maintained in a miscible condition, and mechanically agitating the mixture, and after mixing for a predetermined period while in a miscible condition, raising the temperature of the mass and reducing the pressure in the confined space to increase the reactivity of the mixture and to complete the reaction, and subsequently reducing the pressure to crystallize and dry the reaction product.

In testimony whereof we affix our signatures.

BEVERLY OBER.
EDWARD H. WIGHT.